United States Patent
Zhang et al.

(10) Patent No.: US 9,608,344 B2
(45) Date of Patent: Mar. 28, 2017

(54) ASSEMBLY COMPRISING COAXIAL CABLE AND RIGHT-ANGLED COAXIAL CONNECTOR AND MANUFACTURING METHOD THEREOF

(71) Applicant: CommScope Technologies LLC, Hickory, NC (US)

(72) Inventors: Yujun Zhang, Suzhou (CN); Yujun Dai, Suzhou (CN); Xiaodong Liu, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/009,180

(22) Filed: Jan. 28, 2016

(65) Prior Publication Data

US 2016/0226161 A1    Aug. 4, 2016

(30) Foreign Application Priority Data

Jan. 30, 2015   (CN) .......................... 2015 1 0048293

(51) Int. Cl.
*H01R 9/05*     (2006.01)
*H01R 4/02*     (2006.01)
(Continued)

(52) U.S. Cl.
CPC ............ *H01R 9/0503* (2013.01); *B23K 1/00* (2013.01); *H01R 4/022* (2013.01);
(Continued)

(58) Field of Classification Search
CPC .................................................... H01R 24/545
(Continued)

(56) References Cited

U.S. PATENT DOCUMENTS

| 4,932,898 A | 6/1990 | Goodman et al. |
| 5,167,545 A * | 12/1992 | O'Brien ................. H01R 4/723 439/578 |

(Continued)

FOREIGN PATENT DOCUMENTS

JP        2002-334754        11/2002

OTHER PUBLICATIONS

International Search Report and Written Opinion for corresponding PCT Application No. PCT/US2016/015287, date of mailing Jun. 13, 2016, 9 pages.

*Primary Examiner* — Tho D Ta
(74) *Attorney, Agent, or Firm* — Myers Bigel, P.A.

(57) ABSTRACT

An assembly includes a right-angled coaxial connector, a first coaxial cable and a second coaxial cable. The right-angled coaxial connector includes a first component and a second component connected to a first coaxial cable and a second coaxial cable respectively. The inner conductor and the outer conductor of the first coaxial cable and the first inner conductor and the first outer conductor of the first component, the inner conductor and the outer conductor of the second coaxial cable and the second inner conductor and the second outer conductor of the second component, as well as the first inner conductor and the first outer conductor of the first component and the second inner conductor and the second outer conductor of the second component are permanently connected in a single welding procedure through a first soldering element, a second soldering element and a third soldering element, respectively.

19 Claims, 4 Drawing Sheets

(51) Int. Cl.
*H01R 43/02* (2006.01)
*B23K 1/00* (2006.01)
*H01R 24/54* (2011.01)
*H01R 103/00* (2006.01)

(52) U.S. Cl.
CPC ..... *H01R 43/0207* (2013.01); *H01R 43/0235* (2013.01); *H01R 24/545* (2013.01); *H01R 2103/00* (2013.01)

(58) Field of Classification Search
USPC ............................................................ 439/582
See application file for complete search history.

(56) References Cited

U.S. PATENT DOCUMENTS

| | | | | |
|---|---|---|---|---|
| 5,232,377 | A * | 8/1993 | Leibfried, Jr. | H01R 4/024 439/320 |
| 5,281,167 | A * | 1/1994 | Le | H01R 43/0242 439/578 |
| 5,579,575 | A * | 12/1996 | Lamome | H01R 4/723 174/88 C |
| 6,860,761 | B2 | 3/2005 | Lee et al. | |
| 7,419,403 | B1 | 9/2008 | Paynter | |
| 7,445,458 | B1 | 11/2008 | Yamane | |
| 8,984,745 | B2 * | 3/2015 | Paynter | H01R 43/02 29/828 |
| 9,054,471 | B2 * | 6/2015 | Hosler, Sr. | H01R 24/542 |
| 2015/0236458 | A1 * | 8/2015 | Zimmerhaeckel | H01R 24/545 439/582 |

\* cited by examiner

ASSEMBLY COMPRISING COAXIAL CABLE AND RIGHT-ANGLED COAXIAL CONNECTOR AND MANUFACTURING METHOD THEREOF

RELATED APPLICATION

The present application claims priority from and the benefit of Chinese Patent Application No. 201510048293.5, filed Jan. 30, 2015, the disclosure of which is hereby incorporated herein by reference in its entirety.

TECHNICAL FIELD

The present application relates to the field of radio frequency communication devices, in particular to an assembly comprising a coaxial cable and a right-angled coaxial connector and to a method for manufacturing the assembly.

BACKGROUND

With the continuous development of urbanization and mobile communication, small and miniature base stations are becoming mainstream and find particular use in indoor applications, so that assemblies comprising coaxial cables and right-angled coaxial connectors are increasingly widely used.

Manufacturing costs of the existing right-angled coaxial connectors are high due to relative complex structures of the connector. In order to reduce the cost, multiple-component structures are generally adopted to reduce material waste and processing difficulty, so as to reduce the overall cost. At present, the right-angled coaxial connectors commercially available are generally connected into one piece by means of an interference press-fit, a threaded connection and silver wire brazing. However, these methods have their own advantages and disadvantages. Specifically, right-angled coaxial connectors connected into one piece through an interference press-fit require sufficient press fit space and have strict requirements on fit tolerances. Right-angled coaxial connectors connected into one piece through a threaded connection require threading-locking glue, have strict requirements on torque and have a lower torsional resistance. Right-angled coaxial connectors connected into one piece through silver wire brazing require silver wire brazing of semi-finished products, and as the welding temperature of the silver wire brazing is relatively high, the molecular structures of the metal materials of the right-angled coaxial connectors will be affected. In addition, as the welding temperature of the silver wire brazing is relatively high, the coaxial cables and the right-angled coaxial connectors cannot be welded together in a single welding procedure, due to the fact that the plating and the insulating layers of the coaxial cables cannot withstand the welding temperature of the silver wire brazing. Therefore, for the silver wire brazing, it is necessary for the various components of the right-angled coaxial connectors to be welded together firstly, and then the coaxial cables and the right-angled coaxial connectors are welded together by means a welding process with a lower welding temperature.

SUMMARY

In order to reduce or at least partially overcome the above defects in the prior art, the present application provides an assembly comprising a right-angled coaxial connector, a first coaxial cable and a second coaxial cable. The right-angled coaxial connector comprises:

a first component, the first component being provided with a first length direction and a first end along the first length direction, the first component being further provided with a first inner conductor and a first outer conductor, wherein the ends of the first inner conductor and the first outer conductor distal to the first end are electrically connected with an inner conductor and an outer conductor of the first coaxial cable through a first soldering element respectively;

a second component, the second component being provided with a second length direction and a second end along the second length direction, the second length direction being substantially perpendicular to the first length direction, the second component being further provided with a second inner conductor and a second outer conductor, wherein the ends of the second inner conductor and the second outer conductor distal to the second end are electrically connected with an inner conductor and an outer conductor of the second coaxial cable through a second soldering element respectively;

wherein, the first end is provided with a receiving portion substantially surrounding an end of the first inner conductor, and the receiving portion is provided with a first surface substantially surrounding a second end of the first inner conductor and substantially perpendicular to the end of the first inner conductor and a first side wall perpendicularly extending from the first surface towards the second component;

wherein, the second component is provided with a projecting portion substantially surrounding a second end of the second inner conductor, and the projecting portion comprises a second side wall extending parallel to the second inner conductor;

wherein, an outer surface of the second side wall is in interference fit with an inner surface of the first side wall;

wherein, a third soldering element is further arranged between an end face of the second side wall and the first surface, for permanently connecting the first component and the second component; and wherein, the inner conductor and the outer conductor of the first coaxial cable and the first inner conductor and the first outer conductor, the inner conductor and the outer conductor of the second coaxial cable and the second inner conductor and the second outer conductor, as well as the first inner conductor and the first outer conductor of the first component and the second inner conductor and the second outer conductor of the second component are permanently connected in a single welding procedure through the first soldering element, the second soldering element and the third soldering element, respectively.

The assembly comprising the coaxial cables and the right-angled coaxial connector according to the present application at least relieves or avoids the defects of similar assemblies in the prior art. Specifically, compared with right-angled coaxial connectors connected into one piece only through interference press-fit, the right-angled coaxial connector of the assembly of the present application does not require large press-fit space and strict fit tolerance. Compared with right-angled coaxial connectors connected into one piece through threaded connection, the right-angled coaxial connector of the assembly of the present application does not require thread-locking glue and has a higher torsional resistance. In addition, compared with right-angled coaxial connectors connected into one piece through silver wire brazing, as the welding temperature of the soldering element is much lower than the welding temperature of silver wire brazing, the right-angled coaxial connector of the assembly of the present application can be connected in the case where the first component and the second component of the right-angled coaxial connector are finished products, and the molecular structure of the metal material of the right-angled coaxial connector will not be affected, thereby ensuring the mechanical performance and electrical performance of the right-angled coaxial connector, and moreover, since the welding temperature of the soldering element is lower, the first and second coaxial cables and the first component and the second component of the right-angled coaxial connector can be simultaneously welded in a single welding procedure.

In some embodiments, the first, second and third soldering elements are melted by a high frequency welding machine, and then are cured, so as to permanently connect the first component and the second component as well as the first coaxial cable and the second coaxial cable.

In some embodiments, the projecting portion comprises an insulating sleeve arranged between the second side wall and the second inner conductor, and the insulating sleeve abuts against the first surface so as to prevent the melted third soldering element from flowing towards the second inner conductor.

In some embodiments, the first surface is provided with a recess at a position adjacent to the first side wall, and the third soldering element is arranged in the recess.

In some embodiments, a recess is arranged on the end face of the second side wall, and the third soldering element is arranged in the recess.

In some embodiments, the receiving portion and the projecting portion are sized in such a manner that the third soldering element is fixedly clamped between the end face of the second side wall and the first surface when the first side wall is in interference fit with the second side wall.

In some embodiments, at least one ventilation groove in communication with the outside of the right-angled coaxial connector is arranged on at least one of the inner surface of the first side wall and the outer surface of the second side wall, for exhausting gases when melting the third soldering element.

In some embodiments, an inner edge of the first side wall is rounded or chamfered so as to guide the projecting portion when the projecting portion is inserted in the receiving portion. Therefore, proper alignment between the first inner conductor and the second inner conductor can be ensured, so as to achieve a reliable and uniform electrical connection.

In some embodiments, an outer edge of the second side wall is rounded or chamfered so as to guide the projecting portion when the projecting portion is inserted in the receiving portion. Therefore, proper alignment between the first inner conductor and the second inner conductor can be ensured, so as to achieve a reliable and uniform electrical connection.

In some embodiments, the inner surface of the first side wall and the outer surface of the second side wall are formed into complementary tapering surfaces, for guiding the projecting portion when the projecting portion is inserted in the receiving portion. Therefore, proper alignment between the first inner conductor and the second inner conductor can be ensured, so as to achieve a reliable and uniform electrical connection.

In some embodiments, the projecting portion comprises a boss located on the outer side of the second side wall, and the boss is adjacent to but is not contact with the end face of the first side wall, so that the at least one ventilation groove is in communication with the outside of the right-angled coaxial connector.

In some embodiments, at least two ventilation grooves in communication with the outside of the right-angled coaxial connector are arranged on at least one of the inner surface of the first side wall and the outer surface of the second side wall, and the at least two ventilation grooves are uniformly distributed around the second inner conductor. Due to the fact that the at least two ventilation grooves are uniformly distributed around the second inner conductor, gas generated during welding can be uniformly discharged so as to ensure uniform welding quality.

In addition, the present application further provides a method for manufacturing an assembly comprising a right-angled coaxial connector, a first coaxial cable and a second coaxial cable. The right-angled coaxial connector comprises a first component and a second component, and the method comprises:

providing the first component, wherein the first component is provided with a first length direction and a first end along the first length direction, and the first component is further provided with a first inner conductor and a first outer conductor;

providing the first coaxial cable and a first soldering element, an inner conductor and an outer conductor of the first coaxial cable abut the ends of the first inner conductor and the first outer conductor that are distal to the first end respectively, and the first soldering element is located between the first coaxial cable and the first component;

providing the second component, wherein the second component is provided with a second length direction and a second end along the second length direction, the second length direction is substantially perpendicular to the first length direction, and the second component is further provided with a second inner conductor and a second outer conductor;

providing the second coaxial cable and a second soldering element, wherein an inner conductor and an outer conductor of the second coaxial cable abut the ends of the second inner conductor and the second outer conductor that are distal to the second end, and the second soldering element is located between the second coaxial cable and the second component; and providing a third soldering element, the third soldering element is located between the first component and the second component;

wherein, the first end is provided with a receiving portion substantially surrounding one end of the first inner conductor, and the receiving portion is provided with a first surface substantially surrounding the one end of the first inner conductor and substantially perpendicular to the one end of the first inner conductor and a first side wall perpendicularly extending from the first surface towards the second component;

wherein, the second component is provided with a projecting portion substantially surrounding one end of the second inner conductor, and the projecting portion comprises a second side wall extending parallel to the second inner conductor; and the method further comprises:

arranging the third soldering element on the end face of the second side wall and/or on the first surface;

inserting the projecting portion into the receiving portion so as to form an interference fit between the outer surface of the second side wall and the inner surface of the first side wall, so that and the soldering element is arranged between the end face of the second side wall and the first surface; and simultaneously heating the first, second and third soldering elements to melt the first, second and third soldering elements, and then curing the first, second and third soldering elements so as to permanently connect the first component, the second component, the first coaxial cable and the second coaxial cable.

The assembly comprising the coaxial cable and the right-angled coaxial connector manufactured according to the method of the present application at least relieves or avoids the defects of right-angled coaxial connector in the prior art. Specifically, compared with right-angled coaxial connectors connected into one piece only through interference press-fit, the right-angled coaxial connector of the assembly manufactured according to the method of the present application does not require large press-fit space and strict fit tolerance. Compared with right-angled coaxial connectors connected into one piece through threaded connection, the right-angled coaxial connector of the assembly manufactured according to the method of the present application does not require thread-locking glue and has a higher torsional resistance. In addition, compared with right-angled coaxial connectors connected into one piece through silver wire brazing, as the welding temperature of the soldering element is much lower than the welding temperature of silver wire brazing, the right-angled coaxial connector of the assembly manufactured according to the method of the present application can be connected in the case where the first component and the second component of the right-angled coaxial connector are finished products, and the molecular structure of the metal material of the right-angled coaxial connector will not be affected, thereby ensuring the mechanical performance and electrical performance of the right-angled coaxial connector, and moreover, since the welding temperature of the soldering element is lower, the first and second coaxial cables and the first component and the second component of the right-angled coaxial connector can be simultaneously welded in a single welding procedure.

In the method, in some embodiments, the first, second and third soldering elements are melted by the high frequency induction heating.

In some embodiments, the method further comprises providing an insulating sleeve before inserting the projecting portion into the receiving portion, the insulating sleeve is arranged between the second side wall and the second inner conductor, and after the projecting portion is inserted into the receiving portion, the insulating sleeve abuts against the first surface so as to prevent the melted third soldering element from flowing towards the second inner conductor.

In some embodiments, the method further comprises: before inserting the projecting portion into the receiving portion, forming on the first surface a recess for accommodating the third soldering element at a position adjacent to the first side wall.

In some embodiments, the method further comprises: before inserting the projecting portion into the receiving portion, forming on the end face of the second side wall a recess for accommodating the third soldering element.

In some embodiments, the method further comprises setting the sizes of the receiving portion and the projecting portion in such a manner that the third soldering element is fixedly clamped between the end face of the second side wall and the first surface when the first side wall is in interference fit with the second side wall, so as to ensure that the soldering element is located at a desired position during subsequent welding process.

In some embodiments, the method further comprises: before inserting the projecting portion into the receiving portion, forming, on at least one of the inner surface of the first side wall and the outer surface of the second side wall, at least one ventilation groove in communication with the outside of the right-angled coaxial connector, for discharging gas generated when melting the third soldering element.

In some embodiments, the method further comprises: before inserting the projecting portion into the receiving portion, rounding or chamfering the inner edge of the first side wall so as to guide the projecting portion when inserting the projecting portion into the receiving portion. Therefore, proper alignment between the first inner conductor and the second inner conductor can be ensured, so as to obtain a reliable and uniform electrical connection.

In some embodiments, the method further comprises: before inserting the projecting portion into the receiving portion, rounding or chamfering the outer edge of the second side wall so as to guide the projecting portion when inserting the projecting portion into the receiving portion. Therefore, proper alignment between the first inner conductor and the second inner conductor can be ensured, so as to obtain a reliable and uniform electrical connection.

In some embodiments, the method further comprises: before inserting the projecting portion into the receiving portion, forming the inner surface of the first side wall and the outer surface of the second side wall into complementary tapering surfaces, for guiding the projecting portion when inserting the projecting portion into the receiving portion. Therefore, proper alignment between the first inner conductor and the second inner conductor can be ensured, so as to obtain a reliable and uniform electrical connection.

In some embodiments, the method further comprises: before inserting the projecting portion into the receiving portion, forming a boss on the outer side of the second side wall, and the boss is adjacent to but is not contact with the end face of the first side wall, so that the at least one ventilation groove is in communication with the outside of the right-angled coaxial connector.

In some embodiments, the method further comprises: before inserting the projecting portion into the receiving portion, forming, on at least one of the inner surface of the first side wall and the outer surface of the second side wall, at least two ventilation grooves in communication with the outside of the right-angled coaxial connector, and the at least two ventilation grooves are uniformly distributed around the second inner conductor. Since the at least two ventilation grooves are uniformly distributed around the second inner conductor, gas generated during welding can be uniformly discharged to ensure a uniform welding quality.

In the method, in some embodiments, the first, second and third soldering elements are in the forms of soldering element rings, soldering element wires or soldering element agents.

In the method, in some embodiments, the first, second and third soldering elements are heated for about 10 seconds by means of the high frequency induction heating so as to melt the first, second and third soldering elements.

In the method, in some embodiments, the first, second and third soldering elements are heated to about 400° C. to melt the first, second and third soldering elements.

The welding temperature is controlled at about 400° C., so that a higher welding quality can be achieved, and this welding temperature has no adverse effect on the metal material of the right-angled coaxial connector and the plating and the insulating layers of the first cable coaxial and the second coaxial cable. In addition, since the welding temperature is lower, unlike silver wire brazing used in the prior art by which two components of the coaxial connector can only be welded when the two components are semi-finished products, the first component and the second component of the right-angled coaxial connector forming the assembly of the present application can be welded at finished product state. Further, as mentioned above, since the welding temperature of the soldering element is lower, the first and second coaxial cables and the first component and the second component of the right-angled coaxial connector can be simultaneously welded in a single welding procedure.

According to the above method of the present application, a preliminary positioning of the first component and the second component of the right-angled coaxial connector is obtained by pre-pressing the first component and the second components with appropriate tolerance in a guided manner. By appropriately setting the tolerance, the stability of the preliminary positioning can be ensured to be high enough to prevent the positions of the first component and the second component from changing in the subsequent welding procedures. In addition, the soldering element is arranged on the first component and/or the second component in advance; therefore, after the step of preliminary positioning, the soldering element is fixedly clamped between the first component and the second component, so as to ensure that the soldering element is in a desired position in the welding procedure. In addition, in some embodiments, the first side wall and the second side wall may have a large chamfer to increase the contact area of the soldering element. In addition, the joint between the first component and the second component, the joint between the first component and the first coaxial cable and the joint between the second component and the second coaxial cable are heated by high frequency induction welding so as to fully melt the soldering elements at respective joints; therefore, the two components of the right-angled coaxial connector as well as the first and second coaxial cables can be firmly connected. The assembly comprising the coaxial cables and the right-angled coaxial connector manufactured according to the method has a higher connection strength and more uniform mechanical performance and electrical performance, and the manufacturing process is simplified and shortened.

In addition, as mentioned above, the widely used high frequency welding machine is adopted in the manufacturing method of the present application, and the heating temperature of the high frequency welding machine is about 400° C. Since the heating temperature is relatively lower, the high frequency welding machine can be applied to the electroplated first component and the second component as well as the first coaxial cable and the second coaxial cable without damaging a supporting plastic element and sealing elements in the right-angled coaxial connector and the plating and the insulating layers of the first and second coaxial cables, let alone damaging the molecular structure of the metal material.

BRIEF DESCRIPTION OF THE DRAWINGS

The present application will be described below in more detail by way of example with reference to accompanying drawings, in which.

DETAILED DESCRIPTION OF THE EMBODIMENTS

Detailed embodiments of the present application will be given by way of example with reference to the accompany drawings. It should be understood that, the embodiments are not intended to limit the scope of the present application. That is, any examples given in the description is not restrictive, but is merely exemplary.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

With reference to FIG. 1 to FIG. 4, an assembly 1 according to the present application comprises a first coaxial cable 2 and a second coaxial cable 3 and a right-angled coaxial connector 100. The right-angled coaxial connector 100 comprises a first component 10 and a second component 20. The first component 10 is provided with a first length direction L1 and a first end 11 along the first length direction L1. The first component 10 is further provided with a first inner conductor 12 and a first outer conductor. Ends of the first inner conductor 12 and the first outer conductor distal to the first end 11 are electrically connected with an inner conductor and an outer conductor of the first coaxial cable 2 through a first soldering element 11*a*. The second component 20 is provided with a second length direction L2 and a second end 21 along the second length direction L2. The second length direction L2 is substantially perpendicular to the first length direction L1. The second component 20 is further provided with a second inner conductor 22 and a second outer conductor. Ends of the second inner conductor 22 and the second outer conductor distal to the second end 21 is electrically connected with the inner conductor and the outer conductor of the second coaxial cable 3 through a second soldering element 21*a*. The first end 11 is provided with a receiving portion 13 substantially surrounding one end 12*a* of the first inner conductor 12. The receiving portion 13 is provided with a first surface 14 substantially surrounding the one end 12*a* of the first inner conductor 12 and substantially perpendicular to the one end 12*a* of the first inner conductor 12 and a first side wall 15 extending perpendicularly from the first surface 14 towards the second component 20. The second component 20 is provided with a projecting portion 23 substantially surrounding one end 22*a* of the second inner conductor 22. The projecting portion 23 comprises a second side wall 24 extending parallel to the second inner conductor. An outer surface 24*a* of the second side wall 24 is in interference fit with the inner surface 15a of the first side wall 15, so that the second side wall 24 and the first side wall 15 can be mutually fixed by the interference fit only. A third soldering element 30 is further arranged between the end face 24b of the second side wall 24 and the first surface 14. The inner conductor and the outer conductor of the first coaxial cable 2 and the first inner conductor 12 and the first outer conductor, the inner conductor and the outer conductor of the second coaxial cable 3 and the second inner conductor 22 and the second outer conductor, as well as the first inner conductor and the first outer conductor of the first component 10 and the second inner conductor and the second outer conductor of the second component 20 are permanently connected through the first soldering element, the second soldering element and the third soldering element 30, respectively, in a single welding procedure.

The right-angled coaxial connector 100 of the assembly of the present application at least relieves or avoids the defects of the right-angled coaxial connector in the prior art. Specifically, compared with the right-angled coaxial connectors connected into one piece only through an interference press-fit, right-angled coaxial connector 100 of the assembly of the present application does not require larger press fit space and strict fit tolerance. Compared with right-angled coaxial connectors connected into one piece through a threaded connection, the right-angled coaxial connector 100 of the assembly of the present application does not require thread-locking glue and has a higher torsional resistance. In addition, compared with right-angled coaxial connectors connected into one piece through silver wire brazing, since the welding temperatures of the first, second and third soldering elements are much lower than the welding temperature of silver wire brazing, the right-angled coaxial connector 100 of the assembly of the present application can be connected in the case where the first component and the second component of the right-angled coaxial connector are finished products, and the molecular structure of the metal material of the right-angled coaxial connector will not be affected, thereby ensuring the mechanical performance and electrical performance of the right-angled coaxial connector. Moreover, since the welding temperature of the soldering element is lower, the first component 10, the second component 20, the first coaxial cable and the second coaxial cable may be simultaneously welded together in a single welding procedure.

The third soldering element 30 and the first and second soldering elements are melted by heating of a high frequency welding machine, and then are cured to permanently connect the first component, the second component and the first and second coaxial cables.

The projecting portion 23 comprises an insulating sleeve 40 arranged between the second side wall 24 and the second inner conductor 22, and the insulating sleeve 40 abuts against the first surface 14 so as to prevent the melted third soldering element 30 from flowing towards the second inner conductor 22.

The first surface 14 is provided with a recess 50 at a position adjacent to the first side wall 15, and the third soldering element 30 is arranged in the recess 50. In addition, In some embodiments, a corresponding recess (not shown) is arranged on the end face 24b of the second side wall 24, and the third soldering element 30 is also arranged in the corresponding recess.

In one embodiment of the present application, the receiving portion 13 and the projecting portion 23 are sized in such a manner that the third soldering element 30 is fixedly clamped between the end face 24b of the second side wall 24 and the first surface 14 when the first side wall 15 is in interference fit with the second side wall 24, therefore, the third soldering element 30 remains at a desired position in the subsequent welding process.

In one embodiment of the present application, at least one ventilation groove (not shown) in communication with the outside of the right-angled coaxial connector 100 is arranged on at least one of the inner surface 15a of the first side wall 15 and the outer surface 24a of the second side wall 24, for discharging gas when melting the third soldering element 30. In some embodiments, at least two ventilation grooves (not shown) in communication with the outside of the right-angled coaxial connector 100 are arranged on at least one of the inner surface 15a of the first side wall 15 and the outer surface 24a of the second side wall 24, and the at least two ventilation grooves are uniformly distributed around the second inner conductor 22. Since the at least two ventilation grooves are uniformly distributed around the second inner conductor 22, gas generated during welding can be uniformly discharged so as to ensure a uniform welding quality.

Figure 1:
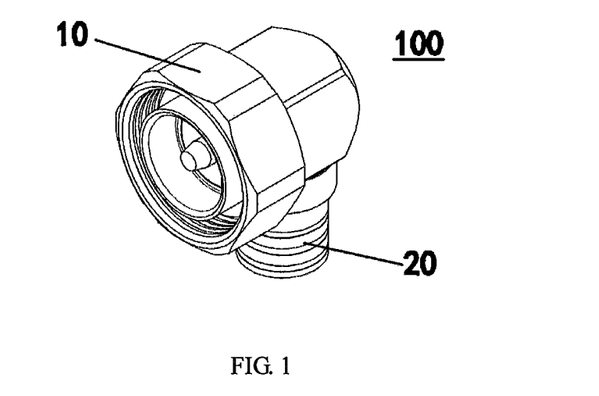
FIG. 1 is a perspective view of a right-angled coaxial connector of an assembly of the present application
Figure 2:
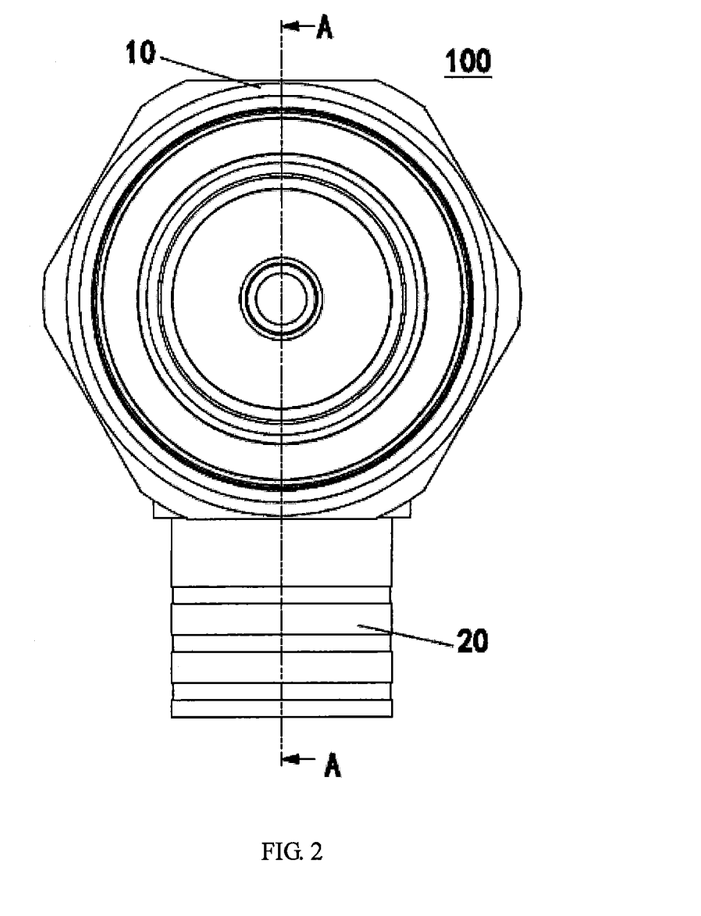
FIG. 2 is a front view of the right-angled coaxial connector of the assembly of the present application
Figure 3:
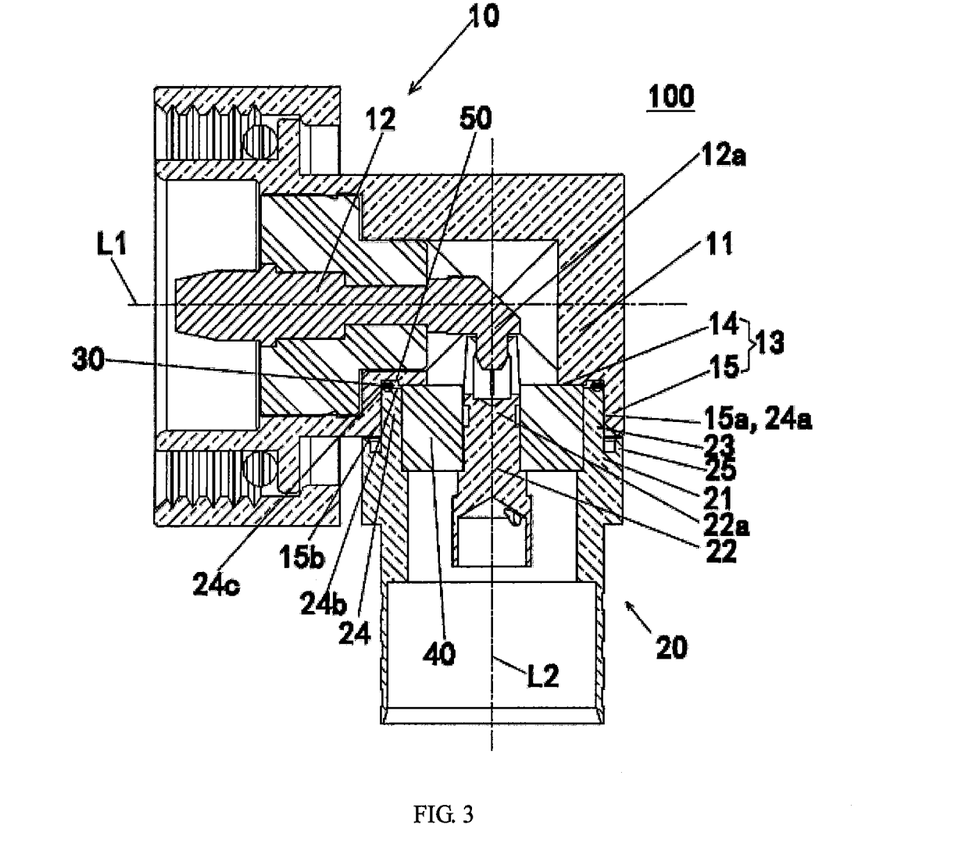
FIG. 3 is a sectional view of the right-angled coaxial connector of the assembly of the present application along an A-A line in FIG. 2.
Figure 4:
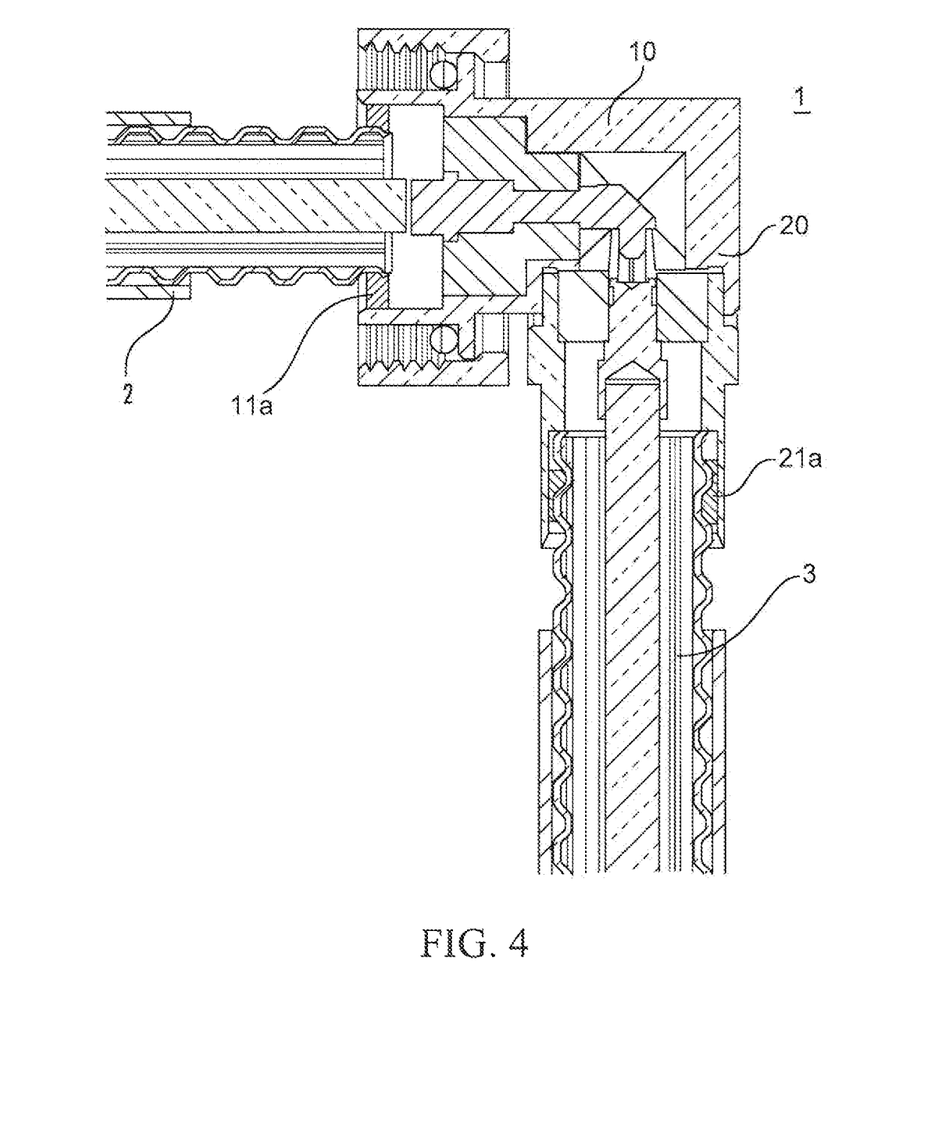
FIG. 4 is a sectional view of the assembly of the present application similar to FIG. 3, wherein first and second coaxial cables are shown.

In one embodiment of the present application, the inner edge 15b of the first side wall 15 is rounded or chamfered (FIG. 3 shows that the inner edge 15b is chamfered) to guide the projecting portion 23 when the projecting portion 23 is inserted into the receiving portion 13. Therefore, proper alignment between the first inner conductor 12 and the second inner conductor 22 can be ensured, so as to obtain a reliable and uniform electrical connection.

In one embodiment of the present application, the outer edge 24c of the second side wall 24 is also rounded or chamfered to guide the projecting portion 23 when the projecting portion 23 is inserted into the receiving portion 13. Therefore, proper alignment between the first inner conductor 12 and the second inner conductor 22 can be ensured, so as to obtain a reliable and uniform electrical connection.

Optionally, in one embodiment of the present application, the inner surface 15a of the first side wall 15 and the outer surface 24a of the second side wall 24 are formed into complementary tapering surfaces, for guiding the projecting portion 23 when the projecting portion 23 is inserted into the receiving portion 13. Therefore, proper alignment between the first inner conductor 12 and the second inner conductor 22 can be ensured, so as to obtain a reliable and uniform electrical connection.

In some embodiments, the projecting portion 23 comprises a boss 25 located on the outer side of the second side wall 24, and the boss 25 is adjacent to but is not contact with the outer end face of the first side wall 15, so that the at least one ventilation groove (not shown) is in communication with the outside of the right-angled coaxial connector 100.

A method for manufacturing the assembly comprising the coaxial cable and the right-angled coaxial connector according to the present application will be described below in detail with reference to the accompany drawings.

First, the first component 10 and the second component 20 having the above structures are formed, and the third soldering element 30, the first coaxial cable and, the first soldering element as well as the second coaxial cable and the second soldering element are provided. The inner conductor and the outer conductor of the first coaxial cable 2 are respectively adjoined with the ends of the first inner conductor 12 and the first outer conductor of the first component 10 that are distal to the first end, and the first soldering element is located between the first coaxial cable 2 and the first component 10. Moreover, the inner conductor and the outer conductor of the second coaxial cable 3 are respectively adjoined with the ends of the second inner conductor 22 and the second outer conductor of the second component 20 that are distal to the second end, and the second soldering element is located between the second coaxial cable 3 and the second component 20. Then, the third soldering element 30 is arranged on the end face 24b of the second side wall 24 and/or in the recess 50 of the first surface 14, and the projecting portion 23 is inserted into the receiving portion 13, so that the outer surface 24a of the second side wall 24 is in an interference fit with the inner surface 15a of the first side wall 15. Sizes and the tolerances of the outer surface 24a of the second side wall 24 and the inner surface 15a of the first side wall 15 are appropriately set so as to ensure that the second side wall 24 and the first side wall 15 can be mutually fixed through the interference fit only and the third soldering element 30 is fixedly clamped between the end face 24b of the second side wall 24 and the first surface 14. Since the chamfered surfaces and/or rounded surfaces and/or the tapering surfaces are provided, the projecting portion 23 can be properly guided when the projecting portion 23 is inserted into the receiving portion 13, so that the adjoined ends of the first inner conductor 12 and the second inner conductor 22 are aligned to obtain a good connecting performance. Then, the first soldering element, the second soldering element and the third soldering element 30 are simultaneously heated by the high frequency induction welding machine to melt the soldering elements. Then, the first soldering element, the second soldering element and the third soldering element 30 cure so as to permanently connect the first component 10 and the second component 20 as well as the first coaxial cable 2 and the second coaxial cable 3 simultaneously.

The assembly comprising the coaxial cables and the right-angled coaxial connector 100 manufactured according to the method of the present application at least relieves or avoids the defects of the right-angled coaxial connector in the prior art. Specifically, compared with right-angled coaxial connectors connected into one piece only through an interference press fit, the right-angled coaxial connector 100 of the assembly manufactured according to the method of the present application does not require large press fit space and strict fit tolerance. Compared with right-angled coaxial connectors connected into one piece through a threaded connection, the right-angled coaxial connector 100 of the assembly manufactured according to the method of the present application does not require thread-locking glue and has a higher torsional resistance. In addition, compared with right-angled coaxial connectors connected into one piece through silver wire brazing, since the welding temperatures of the first, second and third soldering elements are much lower than the welding temperature of silver wire brazing, the right-angled coaxial connector 100 of the assembly manufactured according to the method of the present application can be connected in the case where the first component and the second component of the right-angled coaxial connector are finished products, and the molecular structure of the metal material of the right-angled coaxial connector will not be affected, thereby ensuring the mechanical performance and electrical performance of the right-angled coaxial connector. Moreover, since the welding temperature of the soldering element is lower, the first component 10 and the second component 20 of the right-angled coaxial connector as well as the corresponding first and second coaxial cables can be simultaneously welded together in a single welding procedure.

In one embodiment of the present application, optionally, the third soldering element 30 and the first and second soldering elements are in the form of soldering element rings (as shown in FIG. 3), soldering element wires or soldering element agents.

In one embodiment of the present application, optionally, the third soldering element 30 and the first and second soldering elements are heated for about 10 seconds by the high frequency induction heating to melt the first, second and third soldering elements.

In one embodiment of the present application, optionally, the first, second and third soldering elements are heated to about 400° C. to melt these soldering elements.

The welding temperature is controlled at about 400° C., so that higher welding quality can be achieved, and this welding temperature has no adverse effect on the metal material of the right-angled coaxial connector 100 and the plating and the insulating layers of the first coaxial cable and the coaxial second cable. In addition, since the 400° C. welding temperature is relatively lower, unlike silver wire brazing used in the prior art by which two components of the coaxial connector can only be welded when the two components are semi-finished products, the first component 10 and the second component 20 of the right-angled coaxial connector 100 forming the assembly of the present application can be welded at a finished product state. Further, as mentioned above, since the 400° C. welding temperature of the soldering element is relatively lower, the first component 10 and the second component 20 of the right-angled coaxial connector as well as the corresponding first and second coaxial cables can be simultaneously welded together in a single welding procedure.

According to the above method of the present application, a preliminary positioning of the first component 10 and the second component 20 of the right-angled coaxial connector 100 is obtained by pre-pressing the first component 10 and the second component 20 with appropriate tolerance in a guided manner. By appropriately setting the tolerance, the strength of the preliminary positioning can be ensured to be high enough to prevent the positions of the first component 10 and the second component 20 from changing in the subsequent welding procedure. In addition, the third soldering element 30 is arranged on the first component 10 and/or the second component 20 in advance, therefore after the step of preliminary positioning, the third soldering element is fixedly clamped between the first component 10 and the second component 20, so as to ensure that the third soldering element 30 is in a desired position in the welding procedure. In addition, In some embodiments, the first side wall 15 and the second side wall 24 may have a large chamfer to increase the contact area of the third soldering element 30. In addition, the joint between the first component 10 and the second component 20, the joint between the first component and the first coaxial cable and the joint between the second component and the second coaxial cable are heated by high frequency induction welding so as to fully melt the soldering elements at respective joints, therefore, the first and second components 10 and 20 of the right-angled coaxial connector as well as the first and second coaxial cables can be firmly connected. The assembly comprising the coaxial cables and the right-angled coaxial connector manufactured according to the method has a higher connection strength and more uniform mechanical performance and electrical performance.

In addition, as mentioned above, the widely used high frequency welding machine is adopted in the manufacturing method of the present application, and the heating temperature of the high frequency welding machine is about 400° C. Since the heating temperature is relatively lower, the high frequency welding machine can be applied to the electroplated first component 10 and the second component 20 as well as the first coaxial cable and the second coaxial cable without damaging a supporting plastic element and sealing elements in the right-angled coaxial connector and the plating and the insulating layers of the first and second coaxial cables, let alone damaging the molecular structure of the metal material.

Some embodiments of the present application are illustrated above with reference to the accompanying drawings. Those skilled in the art to which the present application pertains should understand that, specific structures and manufacturing processes shown in the embodiments are merely exemplary, rather than limiting. It is intended that the present application cover the modifications and variations of the application provided they come within the scope of the appended claims and their equivalents.

The invention claimed is:

1. An assembly comprising a right-angled coaxial connector, a first coaxial cable and a second coaxial cable, and the right-angled coaxial connector comprising:
   a first component provided with a first length direction and a first end along the first length direction, the first component being further provided with a first inner conductor and a first outer conductor, and a first end of the first inner conductor and a first end of the first outer conductor that are distal to the first end of the first component being electrically connected with an inner conductor and an outer conductor of the first coaxial cable respectively through a first soldering element;
   a second component provided with a second length direction substantially perpendicular to the first length direction and a second end along the second length direction, the second component being further provided with a second inner conductor and a second outer conductor, and a first end of the second inner conductor and a first end of the second outer conductor that are distal to the second end of the second component being electrically connected with an inner conductor and an outer conductor of the second coaxial cable respectively through a second soldering element;
   wherein, the first end of the first component is provided with a receiving portion substantially surrounding a second end opposite the first end of the first inner conductor, and the receiving portion is provided with a first surface substantially surrounding the second end of the first inner conductor and substantially perpendicular to the second end of the first inner conductor and a first side wall perpendicularly extending from the first surface towards the second component;
   wherein, the second component is provided with a projecting portion substantially surrounding a second end of the second inner conductor, and the projecting portion comprises a second side wall extending parallel to the second inner conductor;
   wherein, an outer surface of the second side wall is in interference fit with an inner surface of the first side wall;
   wherein, a third soldering element is further arranged between an end face of the second side wall and the first surface; and
   wherein, the inner conductor and the outer conductor of the first coaxial cable and the first inner conductor and the first outer conductor, the inner conductor and the outer conductor of the second coaxial cable and the second inner conductor and the second outer conductor, as well as the first component and the second component are permanently connected in a single welding procedure through the first soldering element, the second soldering element and the third soldering element, respectively.

2. The assembly according to claim 1, characterized in that, the first, second and third soldering elements are melted by a high frequency welding machine, and then are cured, so as to permanently connect the first component and the second component as well as the first coaxial cable and the second coaxial cable.

3. The assembly according to claim 1, characterized in that, the projecting portion comprises an insulating sleeve arranged between the second side wall and the second inner conductor, and the insulating sleeve abuts against the first surface so as to prevent the melted third soldering element from flowing towards the second inner conductor.

4. The assembly according to claim 1, characterized in that, the first surface is provided with a recess at a position adjacent to the first side wall, and the third soldering element is arranged in the recess.

5. The assembly according to claim 1, characterized in that, a recess is arranged on the end face of the second side wall, and the third soldering element is arranged in the recess.

6. The assembly according to claim 1, characterized in that, the receiving portion and the projecting portion are sized in such a manner that the third soldering element is fixedly clamped between the end face of the second side wall and the first surface when the first side wall is in interference fit with the second side wall.

7. The assembly according to claim 1, characterized in that, at least one ventilation groove in communication with the outside of the right-angled coaxial connector is arranged on at least one of the inner surface of the first side wall and the outer surface of the second side wall.

8. The assembly according to claim 1, characterized in that, at least two ventilation grooves in communication with the outside of the right-angled coaxial connector are arranged on at least one of the inner surface of the first side wall and the outer surface of the second side wall, and the at least two ventilation grooves are uniformly distributed around the second inner conductor.

9. A method for manufacturing an assembly comprising a right-angled coaxial connector, a first coaxial cable and a second coaxial cable, the right-angled coaxial connector comprising a first component and a second component, characterized in that, the method comprising:
   providing the first component with a first length direction and a first end along the first length direction, the first component being further provided with a first inner conductor and a first outer conductor;
   providing the first coaxial cable and a first soldering element, an inner conductor and an outer conductor of the first coaxial cable abutting a first end of the first inner conductor and a first end of the first outer conductor that are distal to the first end of the first component respectively, and the first soldering element being located between the first coaxial cable and the first component;
   providing the second component provided with a second length direction substantially perpendicular to the first length direction and a second end along the second length direction, the second component being further provided with a second inner conductor and a second outer conductor;
   providing the second coaxial cable and a second soldering element, an inner conductor and an outer conductor of the second coaxial cable abutting a first end of the second inner conductor and a first end of the second outer conductor that are distal to the second end of the second component, and the second soldering element being located between the second coaxial cable and the second component; and providing a third soldering element, the third soldering element being located between the first component and the second component;

wherein, the first end of the first component is provided with a receiving portion substantially surrounding a second end opposite the first end of the first inner conductor, and the receiving portion is provided with a first surface substantially surrounding the second end of the first inner conductor and substantially perpendicular to the second end of the first inner conductor and a first side wall perpendicularly extending from the first surface towards the second component;

wherein, the second component is provided with a projecting portion substantially surrounding one end of the second inner conductor, and the projecting portion comprises a second side wall extending parallel to the second inner conductor; and the method farther comprises:

arranging the third soldering element on the end face of the second side wall and/or on the first surface;

inserting the projecting portion into the receiving portion so as to form an interference fit between the outer surface of the second side wall and the inner surface of the first side wall, so that the second side wall and the first side wall can be mutually fixed by the interference fit only, and the third soldering element is arranged between the end face of the second side wall and the first surface; and simultaneously heating the first, second and third soldering elements to melt the first, second and third soldering elements, and then curing the first, second and third soldering elements so as to permanently connect the first component, the second component, the first coaxial cable and the second coaxial cable.

10. The method according to claim 9, characterized in that, the first, second and third soldering elements are melted by the high frequency induction heating.

11. The method according to claim 9, characterized in that, further comprising providing an insulating sleeve before inserting the projecting portion into the receiving portion, the insulating sleeve being arranged between the second side wall and the second inner conductor, and after the projecting portion is inserted into the receiving portion, the insulating sleeve abuts against the first surface so as to prevent the melted third soldering element from flowing towards the second inner conductor.

12. The method according to claim 9, characterized in that, further comprising: before inserting the projecting portion into the receiving portion, forming on the first surface a recess for accommodating the third soldering element at a position adjacent to the first side wall.

13. The method according to claim 9, characterized in that, further comprising: before inserting the projecting portion into the receiving portion, forming on the end face of the second side wall a recess for accommodating the third soldering element.

14. The method according to claim 9, characterized in that, further comprising setting the sizes of the receiving portion and the projecting portion in such a manner that the third soldering element is fixedly clamped between the end face of the second side wall and the first surface when the first side wall is in interference fit with the second side wall.

15. The method according to claim 9, characterized in that, further comprising: before inserting the projecting portion into the receiving portion, forming, on at least one of the inner surface of the first side wall and the outer surface of the second side wall, at least one ventilation groove in communication with the outside of the right-angled coaxial connector, for discharging gas generated when melting the third soldering element.

16. The method according to claim 9, characterized in that, further comprising: before inserting the projecting portion into the receiving portion, forming, on at least one of the inner surface of the first side wall and the outer surface of the second side wall, at least two ventilation grooves in communication with the outside of the right-angled coaxial connector, wherein, the at least two ventilation grooves are uniformly distributed around the second inner conductor.

17. The method according to claim 9, characterized in that, the first, second and third soldering elements are in the forms of soldering element rings, soldering element wires or soldering element agents.

18. The method according to claim 10, characterized in that, the first, second and third soldering elements are heated for about 10 seconds by means of the high frequency induction heating so as to melt the first, second and third soldering elements.

19. The method according to claim 10, characterized in that, the first, second and third soldering elements are heated to about 400° C. so as to melt the first, second and third soldering elements.

* * * * *

UNITED STATES PATENT AND TRADEMARK OFFICE
CERTIFICATE OF CORRECTION

PATENT NO. : 9,608,344 B2
APPLICATION NO. : 15/009180
DATED : March 28, 2017
INVENTOR(S) : Zhang et al.

Page 1 of 1

It is certified that error appears in the above-identified patent and that said Letters Patent is hereby corrected as shown below:

On the Title Page
(30) Foreign Application Priority Data:
Please correct "2015 1 0048293" to read -- 2015 1 0048293.5 --

In the Specification
Column 9, Line 9:
Please correct "coaxial cable 3 and" to read -- coaxial cable 2 and --

Signed and Sealed this
Seventh Day of November, 2017

Joseph Matal
*Performing the Functions and Duties of the
Under Secretary of Commerce for Intellectual Property and
Director of the United States Patent and Trademark Office*